United States Patent Office 2,834,748
Patented May 13, 1958

2,834,748

SILOXANE-OXYALKYLENE BLOCK COPOLYMERS

Donald L. Bailey, Snyder, and Francis M. O'Connor, Kenmore, N. Y., assignors to Union Carbide Corporation, a corporation of New York No Drawing. Application March 22, 1954
Serial No. 417,935

15 Claims. (Cl. 260—42)

This invention relates generally to organo-silicone compounds and to processes for making them. More particularly, it is concerned with organo-silicone compounds to which the name block copolymer is applied in that there is at least one block or section to the molecule thereof which is a silicone polymer and at least one block or section which is an organic polymer. Without regard to a particular structure or configuration of the molecule, the relative content of the block or blocks of silicone polymer and of the block or blocks of organic polymer present therein, can be illustrated as follows:

$$\frac{W}{W+Z}$$

and $$\frac{Z}{W+Z}$$

in which W represents the molecular weight of the total blocks of silicone polymer and Z represents the molecular weight of the total blocks of organic polymer.

The silicone block is a siloxane polymer or chain of recurring siloxane units which can be represented by a general trivalent formula—

in which R' and R are monovalent hydrocarbon groups and $x$ is an integer which is at least one and $y$ is an integer which is at least 3. By the term monovalent hydrocarbon group is meant a monovalent group composed of carbon and hydrogen as for instance an aliphatic monovalent group of which methyl, ethyl, vinyl, propyl, isopropyl, the butyls, the pentyls, the hexyls, are illustrative. Illustrative of monovalent hydrocarbon aromatic groups are the phenyl, the methyl phenyl and the ethyl phenyl radicals and the aralkyl groups of which benzyl is representative. Thus, a silicone block of four units in which the monovalent hydrocarbon groups are methyl represented by the trivalent formula $MeSiO_3(Me_2SiO)_3\equiv$, has a molecular weight of 313 which is the minimum molecular weight attributable to the silicone block of the compositions of the present invention. Silicone blocks having weights as high as 50,000 can be used but those having a molecular weight of from 500 to 10,000 attributable to the polysiloxane chain are preferred. Furthermore, in compositions wherein the molecular weight attributable to the silicone block is more than 327, the monovalent hydrocarbon groups need not be the same throughout the silicone block but may differ from unit to unit or be different within a single silicon unit.

Thus it is seen that in the block copolymers of this invention, the siloxane chain contains at least one trifunctional silicon atom, that is a silicon atom bonded to a single monovalent hydrocarbon radical, and the remainder of the chain is composed of siloxane units of the type —$R_2SiO$— wherein each silicon atom is attached to two monovalent hydrocarbon radicals. For each such trifunctional silicon atom bonded to a single monovalent hydrocarbon radical, there is at least one and preferably there are three polyoxyalkylene chains in the molecule.

The organic block of our compositions is a linear, predominantly oxyalkylene polymer or chain comprised for the most part of recurring oxyalkylene groups, which groups can be represented by the general formula —$(C_nH_{2n}O)_z$— in which $n$ is an integer from 2 to 4 and $z$ is an integer which is at least 5. Thus, a polyoxyalkylene block of five units in which $n$ is 2 throughout the chain or block has a molecular weight of 220 which is the minimum molecular weight attributable to the block. Organic blocks of a molecular weight up to about 10,000 can be used. A molecular weight from about 500 to 6,000 is preferred, however. The oxyalkylene group need not be the same throughout the organic chain or block which can comprise oxyalkylene groups of differing molecular weights such as oxyethylene; oxy-1,2-propylene; oxy-1,3-propylene and the oxybutylenes.

Thus, the general formula of the block copolymers of this invention is as follows:

$$(R')(SiO_3)_x(R_2SiO)_y[(C_nH_{2n}O)_zR'']_a[R''']_{3x-a} \quad (I)$$

where $x$ is an integer and represents the number of trifunctional silicon atoms bonded to a single monovalent or multivalent hydrocarbon radical, R'; $a$ is an integer and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that the compositions of matter are mixtures of such block copolymers wherein $y$ and $z$ are of different values and that methods of determining the chain length of the polysiloxane chains and the polyoxyalkylene chains give values which represent average chain lengths. In the above formula, R and R'' represent monovalent hydrocarbon radicals, such as alkyl, aryl or aralkyl radicals, and R'' terminates a polyoxyalkylene chain with a monoether group, R''' is an alkyl radical or a radical having the formula $R_3Si$— where R is a monovalent hydrocarbon radical and may terminate a siloxane chain, and R' represents a monovalent or polyvalent hydrocarbon radical, being monovalent when $x$ is 1, divalent when $x$ is 2, trivalent when $x$ is 3, tetravalent when $x$ is 4.

With reference to Formula I above, there is at least one oxyalkylene chain joined to a siloxane chain through a Si—O—C bond, and when $a=1$ and $x=1$, there are two alkyl or $R_3Si$— groups R''' terminating siloxane chains. However, when $a=3$ and $x=1$, there are no such groups present.

One type of block copolymer is represented when $x$ in Formula I is one, and in this instance a branched-chain formula may be postulated as follows:

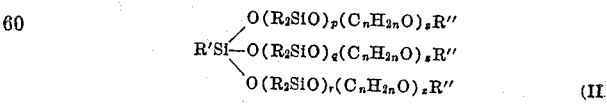

(II)

where $p+q+r=y$ of Formula I and has a minimum value of 3, the other subscripts being the same as in Formula I. In this instance, all three of the oxyalkylene chains are joined to the end of polysiloxane chains of the type —$(R_2SiO)$—. However, another type of branched-chain block copolymer exists when one of the oxyalkylene chains is attached through an oxygen atom to the trifunctional silicon atom bonded only to a single monovalent hydrocarbon radical (R'). This formula may be given as follows:

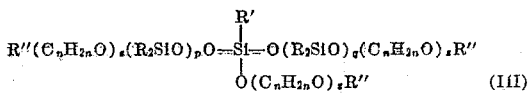

(III)

where $p+q=y$ of Formula I and has a minimum value of 3.

Another type of block copolymer is represented when there are present therein two trifunctional silicon atoms each bonded to a single divalent hydrocarbon radical, and correspondingly present therein six polyoxyalkylene chains. Such block copolymers may be represented by the formula:

$$(O_3SiR'SiO_3)(R_2SiO)_y[(C_nH_{2n}O)_zR'']_6 \quad (IV)$$

where R, R'', y, n and z are as designated for Formula I, and R' is a divalent hydrocarbon radical. Expressed in structural form these block copolymers may be represented by the following formula:

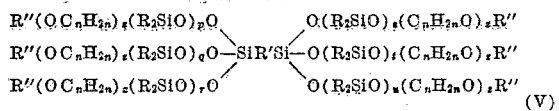

(V)

where $p+q+r+s+t+u$ is equal to $y$ of Formula I and in this instance has a minimum value of 6.

The compositions of matter of this invention may be formed by reacting a polyalkoxy polysiloxane having at least three alkoxy groups attached to a polysiloxane chain with a monohydroxyl polyoxyalkylene mono-ether by an exchange reaction wherein at least part of the alkoxy groups attached to the polysiloxane chain of the polyalkoxy polysiloxane are replaced by polyoxyalkylene mono-ether radicals and the alkoxy groups are removed as the corresponding alkanols. This general reaction may be represented as follows:

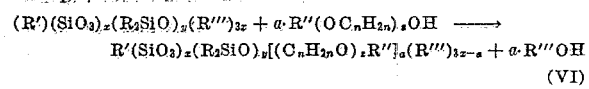

(VI)

where R''' is an alkyl radical bonded to a silicon atom through an oxygen atom and the other subscripts are as defined for Formula I.

The polyalkoxy polysiloxane which is a reactant or starting material for the production of our block copolymer can itself be made by reacting a lower molecular weight polysiloxane with a trialkoxysilane. More specifically, as described in the copending application of D. L. Bailey, Serial No. 398,225, filed December 14, 1953, a trimeric cyclic siloxane, $(R_2SiO)_3$, or a tetrameric cyclic siloxane, $(R_2SiO)_4$, can be equilibrated with a monovalent hydrocarbon-substituted trialkoxysilane, R Si(O Alkyl)$_3$, in the presence of an alkaline catalyst to produce the polysiloxanes having alkoxy end groups as represented in Formula VI above. The molecular weight of the resultant polysiloxane is dependent upon the charging ratios employed. The higher the proportion of cyclic trimer or tetramer to the alkoxysilane, the higher the molecular weight of the polyalkoxy polysiloxane. Thus, polyalkoxy polysiloxanes may be formed having molecular weights from about 300 to 10,000 and upwards.

Similarly hexalkoxy polysiloxanes may be formed by reacting bis(trialkoxysilyl)ethane with the cyclic trimer or tetramer. Higher polyalkoxy polysiloxanes may be formed in an analogous manner. For instance vinyl acetylene may be reacted with triethoxy silane to form tris(triethoxysilyl)butane which may be reacted with the cyclic tetramer to form a nonaethoxy polysiloxane. Also, hexatriene may be reacted with triethoxy silane to form tris(triethoxysilyl)hexane from which a nonaethoxy polysiloxane may be prepared.

The monohydroxy polyoxyalkylene mono-ethers employed in the reaction to form the block copolymers must possess a definite chain length to be effective for the purpose of this invention. Such chain length is herein defined as a minimum of five oxyalkylene groups which is the chain length found necessary to exert a significant effect on such properties as solubility and lubricity of the block copolymers. The specific effect contributed by the polyoxyalkylene chain will vary with the type of oxyalkylene group making up the chain. Thus polysiloxane-polyoxyalkylene block copolymers in which the oxyalkylene groups are composed of oxypropylene groups are water-insoluble, whereas the molecules may be water-soluble when the oxyalkylene group is oxyethylene, depending on the polysiloxane-polyoxyalkylene ratio. The solubility of the polysiloxane-polyoxyalkylene block copolymers will vary from water-soluble to water-insoluble when the polyoxyalkylene chain is composed of both oxyethylene and oxypropylene groups depending on their ratio, and on the polysiloxane-polyoxyethylene ratio.

Monohydroxy polyoxypropylene monoethers suitable for the practice of the invention are described in Fife and Roberts U. S. Patent No. 2,448,664.

Also, monohydroxy oxyethylene-oxy-1,2-propylene monoethers having both oxyethylene oxypropylene groups in the molecule are described in Roberts and Fife U. S. Patent No. 2,425,755. In addition, polyoxyalkylene monoethers containing both oxyethylene and oxypropylene groups in the molecule may be formed by the sequential addition of ethylene oxide and propylene oxide to a monohydric alcohol to form oxyalkylene chains composed of a sequence of oxyethylene groups followed by a sequence of oxypropylene groups or vice versa.

The block copolymers of this invention differ from other types of copolymers in that the molecular weights of the polysiloxane block and of the polyoxyalkylene block can be predetermined and controlled and as the molar ratio in which the two blocks are combined can be changed for instance from the ratio of one siloxane block to one to nine oxyalkylene blocks depending on the number of alkoxy groups in the polyalkoxy polysiloxane and on the number of such groups reacted, it is possible to make block copolymers which differ widely in composition. A few of the many possible combinations are shown in the table below:

TABLE I

*Average molecular weights of block copolymers*

| Molar Ratio Oxyalkylene/Polysiloxane | 1 | 2 | 3 | 1 | 2 | 3 | 1 | 2 | 3 |
|---|---|---|---|---|---|---|---|---|---|
| Av. Molecular Weight of Oxyalkylene Block | 500 | 500 | 500 | 1,000 | 1,000 | 1,000 | 1,500 | 1,500 | 1,500 |
| Av. Molecular Weight of Polysiloxane Block: | | | | | | | | | |
| 500 | 1,000 | 1,500 | 2,000 | 1,500 | 2,500 | 3,500 | 2,000 | 3,500 | 5,000 |
| 1,000 | 1,500 | 2,000 | 2,500 | 2,000 | 3,000 | 4,000 | 2,500 | 4,000 | 5,500 |
| 1,500 | 2,000 | 2,500 | 3,000 | 2,500 | 3,500 | 4,500 | 3,000 | 4,500 | 6,000 |

It is recognized that when one mole of a trialkoxy polysiloxane is reacted with less than three moles of a monohydroxy polyoxyalkylene monoether, the block copolymers will contain alkoxy groups, and when one mole or less of the monoether is used, some of the polyalkoxy polysiloxane will be left unreacted. Such block copolymers, however, are useful in that they may be combined with other polymers containing hydroxyl groups. For instance, by reacting them with alkyd resins containing free hydroxyl groups, it is possible to make silicone modified alkyd resins wherein the compatibility of the silicone portion is increased by the attached block of oxyalkylene units and oxyalkylene units contribute plasticizing properties to the alkyd resin.

Where the block copolymers are not to be used as intermediates, it is preferred that they have a low alkoxy content, and this is achieved in practice by charging in the Reaction VI the number of moles (a) of the monohydroxy oxyalkylene monoether equal to the number of alkoxy groups (3x) in the polyalkoxy polysiloxane. However, as illustrated in the above table, it is possible by this method to make block copolymers which range from a low to a high polysiloxane content.

A unique property of some of the block copolymers is their water-solubility, and block copolymers having that fraction of their molecular weight which is attributable to the oxyethylene groups approximately equal to or greater than those fractions which are attributable to either the polysiloxane units or to oxypropylene or oxybutylene units are water-soluble, and are at least partially water-soluble when the mole-fraction of oxyethylene groups is at least one-fourth of the sum of the mole-fractions of the oxypropylene units and the siloxane units. The water-soluble block copolymers are very useful as antifoam agents and as rubber lubricants, particularly for tire molds, where their water-solubility permits them to be readily applied from an aqueous solution, and any excess lubricant to be readily removed from the molded article by washing. Such property of ready removal by washing also adopts them for use as textile lubricants.

The water-soluble block copolymers are also miscible with water-soluble polyoxyethylene-polyoxypropylene diols, monoethers and diethers and form useful lubricants and hydraulic fluids in combination therewith. By themselves, or in combination with the above diols, monoethers and diethers, or with ethylene glycol or propylene glycol, the water-soluble block copolymers form useful ingredients of lubricants having a water base, commonly termed hydrolubes. As the polyalkoxy polysiloxanes are themselves water-insoluble and immiscible with the above mentioned materials, it is apparent that the block copolymers have greatly enhanced utility.

Block copolymers wherein the polyoxyalkylene block contains few or no oxyethylene units are not water-soluble, but they are miscible with the starting monohydroxy polyoxyalkylene monoethers, or the corresponding diols or diethers, and form useful compositions in combination therewith.

A truly remarkable property of certain of the block copolymers is their load-carrying capacity as metal-to-metal lubricants for moving surfaces. Silicone fluids, such as dimethyl silicone oils, are very poor lubricants for such service, having practically no load-carrying capacity. However, it has been found that the block copolymers, whose polysiloxane content corresponds to a silicon content of between 2% and 25% Si by weight are excellent metal-to-metal lubricants and have better load-carrying capacity than the polyoxyalkylene fluids.

The lubricating properties of some of the block copolymers, as compared to silicone oils, petroleum oils and polyoxyalkylene fluids, is given in the table below:

TABLE II

| | Calc. Percent Si (by wt.) | Viscosities, Cs. | | ASTM Slope | SAE Test Load in Lbs. at 475 R. P. M. | Falex Seizure Test Jaw Load, Lbs. |
|---|---|---|---|---|---|---|
| | | 100° F. | 210° F. | | | |
| Fluid No.: | | | | | | |
| Silicone Oils— | | | | | | |
| 1 | 38 | 270 | 118 | .176 | | |
| 2 | 38 | 80 | 32.5 | .249 | | |
| Petroleum Oil— | | | | | | |
| 3 | 0 | 40 | | | 85 | |
| Oxyalkylene Fluids— | | | | | | |
| 4 | 0 | 86.6 | 16.7 | .54 | | 1,000 |
| 5 | 0 | 61.7 | 11.0 | .57 | 100 | 500 |
| Block Copolymers: | | | | | | |
| Example II | 8.5 | 29.3 | | | | 2,250-2,500 |
| Example V | 22.7 | | | | | 2,500 |
| Example X | 11 | 86.5 | 20.0 | .43 | 310 | |
| Example VI | 9.8 | 49.0 | 11.6 | .50 | 265 | |
| Example IX | 9.6 | 74.3 | 16.8 | .46 | 320 | |

The identification of the fluids referred to in Table II is as follows:

Silicone oils:
(1) Dimethyl silicone oil having a viscosity of 350 cs. at 25° C.
(2) Dimethyl silicone oil having a viscosity of 100 cs. at 25° C.

Petroleum oils:
(3) Naphthenic base petroleum motor oil.

Oxyalkylene fluids:
(4) Reaction product of butanol with a 50-50 by weight mixture of ethylene oxide and propylene oxide, average molecular weight 1350.
(5) Monobutyl ether of polyoxypropylene diol, average molecular weight 1000.

The block copolymers of polysiloxane blocks and polyoxyalkylene blocks thus form useful compositions over a wide range of polysiloxane content, including polysiloxane contents from 5% to 95% by weight of the block copolymer. Within this range, wherein the polysiloxane content, calculated as percent silicon, is between 2% and 25%, the products are excellent lubricants as previously stated. Within the range of 15% to 50% polysiloxane, the block copolymers form useful water-soluble and solvent-soluble fluids. And at higher polysiloxane contents between 50% and 95% the block copolymers are oils having exceptionally low pour points, and suitable as hydraulic fluids.

The process whereby the block copolymers may be formed has been generally set forth in Equation VI.

The condensation reaction depicted in Equation VI is essentially a reversible reaction and is dependent upon the removal of alcoholic products, generally designated as R'''OH, from the reaction mixture in order to force said reactions towards completion. It is apparent, furthermore, that the ultimate quantity of the alcoholic product (R'''OH) removed from each reaction mixture provides an indication of the extent to which that particular condensation reaction between the polyalkoxy polysiloxane and the polyoxyalkylene glycol monoether reactants or starting materials has reached completion.

The rate at which the alcoholic product is removed from the reaction mixture additionally serves to indicate the rate at which the reaction is progressing. That is, if a large quantity of alcoholic product is removed within a short period of reaction time, it may be concluded that the reaction is proceeding at a rapid rate, whereas the reaction is proceeding at a slow rate if the amount of alcoholic product removed in the given time is small.

The alkoxy end-blocked polysiloxanes are normally incompatible with aliphatic monoethers of polyoxyalkylene glycols and difficulties arise in bringing about the complete reaction of the two substances. These difficulties, however, are resolved by carrying out the condensation reaction in a suitable solvent, such as, for example, toluene or xylene, in which the reacting substances are mutually soluble and, thus, brought into intimate contact. The reaction temperature is, therefore, limited by the reflux temperature of the polysiloxane-polyoxyalkylene glycol monoether solution and a higher boiling solvent will permit a higher reaction temperature. Although the type of solvent is critical to the success of the condensation reaction only insofar as the starting materials must be mutually soluble therein, it is also necessary that the amount of said solvent be sufficient to provide a homogeneous solution of the starting materials at the reaction temperature, i. e. the reflux temperature of the solution. In instances where a high molecular weight polyoxyalkylene glycol monoether is employed as a starting material, complete compatibility despite the use of a mutual solvent is not readily attainable. The reaction in these substances progresses but at a much slower rate.

Although the use of toluene and xylene as mutual solvents for the reaction mixture of this invention provide a high enough reflux temperature to carry out the condensation reaction to completion, toluene in certain instances, is to be preferred for practical reasons over xylene. It has been found that on infrequent occasions the higher reflux temperature provided by a xylene solvent encourages undesirable side reactions producing water instead of the expected alcoholic product. This difficulty has been overcome by the use of a toluene solvent which provides a lower reflux temperature and, thus, eliminates or lessens the tendency towards bothersome side reactions. When toluene is used as a solvent the alcoholic product, resulting from the condensation reaction is removed as an azeotrope with toluene.

The catalysts employed in the condensation reactions described by Equation VI are, in general, the organic acids including trifluoroacetic acid, perfluorobutyric acid, perfluoroglutaric acid, monochloroacetic acid, acetic acid, etc., or alkaline substances, such as potassium silanolate, $KO(SiR''_2O)_bK$, wherein $b$ is a positive integer and $R'''$ is an alkyl radical such as methyl or ethyl. The organic acid catalysts are active with most starting materials, and are effective at low concentrations, e. g. as low as 0.1 percent by weight of the starting materials. They produce non-discolored, block copolymers and do not cause any degradation of the polysiloxane molecules to result in products which are low in silicon content as is the tendency of strong acid catalysts and alkaline catalysts. Of the organic acid catalysts, trifluoroacetic acid, perfluorobutyric acid, and perfluoroglutaric acid have proven to provide exceptionally high catalytic activities and, therefore, are to be preferred.

The alkaline catalysts in particular potassium silanolate containing about 3.0 percent by weight of potassium, exhibit very high catalytic activity. It has been found, however, that the use of alkaline catalysts tends to cause the degradation of the polysiloxane chain during the condensation reaction to produce the corresponding cyclic polysiloxanes and organo-silicone products which are low in silicon content. The degradation reaction is of the reversible type and may be opposed by means of opposing the thermodynamic equilibria of said reaction with the addition to the initial reaction mixture of the cyclic polysiloxane expected to be produced by the degradation process brought about under the influence of the alkaline catalyst. For example, in preparing dimethylpolysiloxane-polyoxyalkylene glycol monoether block copolymer with potassium silanolate as a catalyst the addition of appreciable amounts of the cyclic tetramer of dimethyl polysiloxane prevented any degradation caused by the alkaline catalyst and resulted in products which contained the desired silicon content.

While neutral and mildly basic aqueous solutions of the water soluble types of polysiloxane-polyoxyalkylene block copolymers of this invention are stable against hydrolysis and remain clear and homogeneous for extremely long periods of time, strong acids and bases added to or initially present in and unremoved from these solutions tend to attack the readily hydrolyzable Si—O—C bonds present in the molecules of said compounds to bring about the hydrolysis of said block copolymers. The addition of trifluoroacetic acid, for example, to an aqueous solution of water soluble polysiloxane-polyoxyalkylene block copolymers caused these solutions to become turbid within several minutes and separate into polyoxyalkylene glycol monoether aqueous layer and a silicone oil or polysiloxane layer. The removal or neutralization of the acid catalyst employed in the condensation reaction, therefore, may be desirable to provide a hydrolytically stable polysiloxane-polyoxyalkylene glycol monoether compound.

The neutralization of the acid catalyst with stoichiometric amounts of a weak organic base, e. g. triethanol amine, monoethanolamine, monoisopropanolamine, dibutyl amine etc., or sodium bicarbonate, anhydrous ammonia, etc., is to be preferred over the removal of the catalyst, as by washing with water, and subsequent treatment with adsorption material such as silica gel or "Magnesol," inasmuch as the latter process results only in an incomplete removal of the residual acid catalyst.

The following examples will serve to illustrate the invention:

EXAMPLE I(a).—BLOCK COPOLYMER FROM A TRIALKOXY POLYSILOXANE AND A POLYOXYETHYLENEOXYPROPYLENE MONOALKYL ETHER 108.8 pounds of mixed cyclic dimethyl polysiloxanes containing approximately 22% of the tetramer, 20% of the pentamer and 56% of higher cyclic polymers, i. e. $(R_2SiO)_n$ where $n$ is at least 6; 15.6 pounds ethyltriethoxy silane and 19.5 grams of powdered potassium hydroxide were charged to a Pfaudler kettle having a capacity of 30 gallons and equipped with an agitator. The agitator was turned on and the kettle temperature was raised to 150° C. and held there for 3½ hours. At the end of this time the kettle was placed under reduced pressure and the light fractions were stripped off at an absolute pressure of 2 inches Hg in the temperature range of 125° to 150° C. About 12% to 15% of the kettle contents were removed as light fractions. The residue was a viscous oil having an average molecular weight of 1500 measured cryoscopically. Its ethoxy content by analysis was 8.8 wt. percent, in good agreement with the theoretical value of 9 wt. percent for a triethoxypolysiloxane of this molecular weight. This material was used to make a block copolymer as follows:

86.5 pounds (0.057 lb. moles) of monobutoxy oxyethylene-oxy-1,2,propylene monohydroxy compound containing 50% by weight ethylene oxide units and 50% by weight propylene oxide units and having a molecular weight of 1530, and 72 pounds of toluene were charged to the reactor and refluxed through a Dean-Stark trap until no more water could be separated. 28.2 pounds (0.019 mole) of the above triethoxy dimethylpolysiloxane and 76.0 grams of trifluoroacetic acid as catalyst were added to the kettle and the reaction mixture heated with total reflux at 120° C. through the attached fractionating column. Reflux was continued with removal at the head of the column of the ethyl alcohol-toluene azeotrope distilling at 78° to 90° C. 2.55 pounds (0.056 mole) of ethanol were removed. At this point the kettle was cooled to 100° C. and 255 grams of sodium bicarbonate was added to neutralize the acid catalyst. This quantity is about four times that theoretically required, an excess being added for precaution. Reflux was re-established for 30 minutes after which the kettle contents were sparged with nitrogen and the toluene stripped off. The product was filtered to remove residues from the bicarbonate neutralization after which it remained non-turbid with a yellow color. The yield was about 100 pounds which is 90% of theory, the polymer was water-soluble and its viscosity was about 880 centistokes at 25° C. Elemental analysis of this block copolymer gave:

|  | Found, Wt. Percent | Theory, Wt. Percent |
| --- | --- | --- |
| Carbon | 53.5 | 52.7 |
| Hydrogen | 9.2 | 9.5 |
| Silicon | 8.0 | 8.8 |

The product was useful as a release-agent in rubber molding.

This block copolymer had the interesting property of inverse water-solubility; that is, it was soluble in water at temperatures below about 95° F., but not completely soluble at temperatures above this.

EXAMPLE I(b).—BLOCK COPOLYMER FROM A TRIALKOXY POLYSILOXANE AND A POLYPROPYLENE GLYCOL MONOALKYL ETHER

Following the procedure of Example I(a), a trialkoxy polysiloxane of an average molecular weight of 800 was prepared by substituting the following charge:

Cyclic dimethyl polysiloxanes _____lb__ 171.6
Ethyltriethoxysilane _____lb__ 46.8
Powdered potassium hydroxide _____grams__ 31.6

A block copolymer was prepared from this triethoxy end-blocked polydimethylsiloxane by following the procedure of Example I(a) but substituting the following weights of materials:

Triethoxy polydimethylsiloxane
  (M. W. 800) _____ 83.2 lb. (0.104 mole).
Polypropylene glycol monobutyl
  ether (M. W. 714) _____ 226.0 lb. (0.317 mole).
Toluene _____ 79.0 lb.
Trifluoroacetic acid _____ 0.9 lb.
NaHCO$_3$ _____ 2.76 lb.

A water-insoluble liquid copolymer was obtained.

EXAMPLE I(c).—BLOCK COPOLYMER FROM A TRIALKOXY POLYSILOXANE AND A POLYETHYLENE GLYCOL MONOALKYL ETHER

A block copolymer was prepared from the triethoxy end-blocked polydimethylsiloxane of Example I(b) by following the procedure of Example I(a) but substituting the following weights of material:

Triethoxy polydimethylsiloxane
  (M. W. 800) _____ 83.2 lb. (0.104 mole).
Polyethylene glycol monomethyl
  ether (M. W. 750) _____ 226.0 lb. (0.302 mole)
Toluene _____ 79.0 lb.
Trifluoroacetic acid _____ 2.76 lb.
NaHCO$_3$ _____ 0.9 lb.

The product was a soft solid melting at about 90° F. It was soluble in water at temperatures below about 192° F.

*Physical properties of block copolymers of Examples I(a)–I(c)*

The block copolymers of Examples I(a)–I(c) had the following properties:

| Property | Block Copolymer | | |
| --- | --- | --- | --- |
|  | Example I(a) | Example I(b) | Example I(c) |
| Viscosity, cstks., 25° C | 880 | 95 | (¹) |
| Viscosity Temp. Coeff. V. at 210° F./V. at 100° F | 0.82 | 0.77 | 0.81 |
| Sp. Gravity, 25° C./25° C | 1.03 | 0.99 | ² 1.07 |
| Pour Point, ° F. ASTM D-97-52 | −34 | −56 | 95 |
| Surface Tension, dyne/cm | 19.1 at 100° F. | 21.6 at 20° C. | 19.8 at 100° F. |

¹ Solid at 25° C., viscosity at 100° F. is 130 cstks.
² 35° C./25° C.

*Solubilities of block copolymers of Examples I(a)–I(c)*

These block copolymers had the following solubilities (S—soluble; I—insoluble) in the following solvents:

| Solvents | Example I(a) | Example I(b) | Example I(c) |
| --- | --- | --- | --- |
| Water | S | I | S |
| Ethanol | S | S | S |
| Isopropanol | S | S | S |
| N-butanol | S | S | S |
| Ethylene glycol | I | I | S below 65% ¹ |
| Glycerol | I | I | I |
| Dioxane | S | S | S |
| Isopropyl Ether | S | S | I |
| Acetone | S | S | S |
| Methyl ethyl ketone | S | S | S |
| Butyl acetate | S | S | S |
| Hexane | I | S | I |
| Gasoline | I | S | I |
| Mineral spirits | S above 50% ¹ | S | I |
| Toluene | S | S | S |
| Carbon tetrachloride | S | S | S |
| Methyl 'Cellosolve' | S | S | S |
| Butyl "Carbitol" | S | S | S |
| Paraffin oil | I | S above 70% ¹ | I |
| Diethyl silicone oil | S | I | I |

¹ Percent by volume of silicone in solution.

EXAMPLE II.—BLOCK COPOLYMER OF A SILOXANE (M. W. 414) AND A POLYPROPYLENE GLYCOL MONOETHER (M. W. 352)

In a two-liter flask connected to a fractionating column there were placed 528 grams (1.5 moles) of the monobutyl ether of a polypropylene glycol (average molecular weight 352), 207 grams (0.5 mole) of a branched chain ethoxy-endblocked dimethylpolysiloxane having an average of three ethoxy groups per molecule (average molecular weight 414), 1.5 grams of trifluoroacetic acid and 500 grams of toluene solvent. The solution was heated at the reflux temperature (115° C.) for 11.5 hours during which time 68.8 grams of ethanol were removed at the head of the column along with a small amount of solvent. This was equivalent to 99.7% of the theoretical amount of ethanol. The solution was then cooled and 10 grams of solid sodium bicarbonate added and the solution refluxed for 30 minutes with stirring to neutralize the acid catalyst. After filtering and removing the toluene solvent under reduced pressure there was obtained 666 grams of a clear amber-colored oil having a viscosity at 100° F. of 29.3 cs. This copolymer was found to have very good lubricating properties and carried a load of 2250–2500 lb. on the standard Falex machine. A polypropylene glycol monobutyl ether fluid of comparable viscosity carried 1000–1200 lb.

EXAMPLE III.—BLOCK COPOLYMER OF A SILOXANE (M. W. 414) AND A POLYALKYLENE GLYCOL MONOETHER (M. W. 3500)

In a two-liter flask connected to a fractionating column there were placed 610 grams (0.174 mole) of the monobutyl ether of a polyalkylene glycol containing 50 wt. percent ethylene oxide and 50 wt. percent propylene oxide units (average molecular weight 3500), 41.4 grams (0.1 mole) of a branched chain ethoxy-endblocked dimethylpolysiloxane having an average of three ethoxy groups per molecule (average molecular weight 414), 1.3 grams trifluoroacetic acid catalyst and 500 grams toluene solvent. The solution was heated at the reflux temperature (120° C.) for 3.5 hours during which time 8.0 grams of ethanol were removed at the head of the column along with a small amount of solvent. This amount of ethanol was equivalent to complete reaction of the glycol monoether. The solution was then cooled and 20 grams of solid sodium bicarbonate added and while stirring the solution was refluxed for 30 minutes to neutralize the acid catalyst. After filtering and removing the toluene solvent under reduced pressure there was obtained 633 grams of a viscous oil having a viscosity at 25° C. of 4,335 cs. This copolymer was found to act as an emulsifying agent for toluene-water systems and was completely soluble in water. It represents a type of block copolymer having free alkoxy groups available for further reaction.

EXAMPLE IV.—BLOCK COPOLYMER OF A SILOXANE (M. W. 10,192) AND A POLYPROPYLENE GLYCOL MONOETHER (M. W. 352)

In a two-liter flask connected to a fractionating column there were placed 42.2 grams (0.12 mole) of the monobutyl ether of a polypropylene glycol (average molecular weight 352), 407.7 grams (0.04 mole) of a branched chain ethoxy-endblocked dimethylpolysiloxane having an average of three ethoxy groups per molecule (average molecular weight 10,192), 0.9 gram of trifluoroacetic acid catalyst and 500 grams of toluene solvent. The solution was heated at the reflux temperature for 3 hours during which time 5.5 grams of ethanol were removed at the head of the column along with a small amount of solvent. This amount of ethanol was equivalent to 100% reaction. The solution was then refluxed with stirring for 30 minutes in the presence of 20 grams of solid sodium bicarbonate to neutralize the acid catalyst. After filtration and removal of the toluene solvent under reduced pressure there were obtained 395 grams of a clear oil having a viscosity at 25° C. of 163 cs. This oil was found to have an exceptionally low pour point of less than —95° F. It also had anti-foam properties.

EXAMPLE V.—BLOCK COPOLYMER OF A SILOXANE (M. W. 10,192) WITH A POLYPROPYLENE GLYCOL MONOETHER (M. W. 2230)

In a two-liter flask there were placed 334.5 grams (0.15 mole) of the monobutyl ether of a polypropylene glycol (average molecular weight 2230), 509.5 grams (0.05 mole) of a branched chain ethoxy-end-blocked dimethylpolysiloxane having an average of three ethoxy groups per molecule (average molecular weight 10,192), 1.7 grams of trifluoroacetic acid catalyst and 675 grams of toluene solvent. The solution which was nonhomogeneous was heated at the reflux temperature (120° C.) for 12 hours during which time 6.9 grams of ethanol were removed at the head of the column along with a small amount of solvent. This amount of ethanol was equivalent to 100% of the theoretical amount. The solution was completely homogeneous at this point. The solution was then refluxed with stirring for 30 minutes in the presence of solid sodium bicarbonate to neutralize the acid catalyst. After filtering and removing the toluene solvent under reduced pressure there was obtained 780 grams of a clear viscous oil having a viscosity at 25° C. of 66,000 cs. This copolymer was completely soluble in ethanol. The shear-viscosity properties were comparable to those of a pure silicone oil with the added advantage of also having good lubricating properties. The copolymer carried up to 2500 lb. load on the Falex machine. This is a marked improvement over a pure silicone oil which cannot be loaded to 100 lb. without seizure. This copolymer was also found to be a good additive for polyoxylalkylene fluids. An interesting property of this copolymer was its emulsifying action for toluene water systems.

EXAMPLE VI.—BLOCK COPOLYMER FROM A TRIALKOXY POLYSILOXANE (M. W. 1110) AND A POLYPROPYLENE GLYCOL MONOALKYL ETHER (M. W. 625)

In a two-liter flask there were placed 937.5 grams (1.5 mole) of the monobutyl ether of a polypropylene glycol (average mol. wt. 625), 555 grams (0.5 mole) of a branched chain ethoxy-end-blocked diethylpolysiloxane having an average of three ethoxy groups per molecule (average mol. wt. 1110), 3.0 grams of trifluoroacetic acid catalyst and 450 grams of toluene solvent. The solution was heated at the reflux temperature (120° C.) for 45 hours during which time ethanol was removed at the head of the column along with a small amount of solvent. The solution was then cooled and 30 grams of solid sodium bicarbonate added and, while stirring, the solution was refluxed for 30 minutes to neutralize the acid catalyst. After filtering and removing the toluene solvent under reduced pressure, there was obtained 1400 grams of a clear oil having a viscosity at 100° F. of 49.0 cs. This oil was found to contain 9.8% silicon (theory was 9.9%). This copolymer was found to have very good lubricating properties having carried a 265 pound load on the SAE test machine.

EXAMPLE VII.—BLOCK COPOLYMER FROM A TRIALKOXY POLYSILOXANE (M. W. 858) AND A POLYPROPYLENE GLYCOL MONOALKYL ETHER (M. W. 625)

In a two-liter flask there were placed 562.5 grams (0.9 mole) of the monobutyl ether of a polypropylene glycol (average mol. wt. 625), 257.4 grams (0.3 mole) of a branched chain ethoxy-end-blocked dimethylpolysiloxane having an average of three ethoxy groups per molecule (average mol. wt. 858), 1.2 grams of trifluoroacetic acid catalyst and 450 grams of toluene solvent. The solution was heated at the reflux temperature (120° C.) for 5 hours during which time ethanol was removed at the head along with a small amount of solvent. The toluene solvent was removed under reduced pressure. The residual acid catalyst was neutralized by adding 0.9 gram of triethanolamine which gave an oil having a pH of 6.75. The resulting copolymer was a clear oil having a viscosity at 100° F. of 52.3 cs. This oil was found to have excellent lubricating properties having carried 2500-pound load on the standard Falex test machine. Elemental analysis of this block copolymer gave:

|  | Found (wt.-percent) | Theory (wt.-percent) |
| --- | --- | --- |
| Carbon | 54.3 | 54.3 |
| Hydrogen | 9.5 | 9.9 |
| Silicon | 8.7 | 10.7 |

EXAMPLE VIII.—BLOCK COPOLYMER FROM TRIALKOXY POLYSILOXANE (M. W. 1524) AND A POLYETHYLENE GLYCOL MONOALKYL ETHER (M. W. 750)

In a two-liter flask there were placed 450 grams (0.6 mole) of the monomethyl ether of a polyethylene glycol (average mol. wt. 750), 304.8 grams (0.2 mole) of a branched chain ethoxy end-blocked dimethylpolysiloxane having an average of three ethoxy groups per molecule (average mol. wt. 1524), 1.5 grams of trifluoroacetic acid catalyst and 450 grams of toluene solvent. The solution which was non-homogeneous was heated at the reflux temperature (120° C.) for eight hours during which time 28.0 grams of ethanol were removed along with a small amount of solvent. This amount of ethanol was equivalent to complete reaction. The solution was completely homogeneous at this point. The residual acid catalyst was neutralized by stirring the refluxing solution for 30 minutes in the presence of 7.0 grams of sodium bicarbonate. After filtering and removing the toluene solvent under reduced pressure, there was obtained 680 grams of a soft waxy solid which was a liquid at 100° F. having a viscosity of 277.5 cs. This copolymer was found to contain 14.0% silicon which is in good agreement with the theoretical value of 14.6%. This copolymer was soluble in water and was found to be a good emulsifying agent.

EXAMPLE IX.—BLOCK COPOLYMER FROM A TRIALKOXYPOLYSILOXANE (AVERAGE M. W. 858) AND A POLYPROPYLENE GLYCOL MONOALKYL ETHER (AVERAGE M. W. 734)

100.0 pounds (0.136-lb. mole) of the monobutyl ether of a polypropylene glycol (average mol. wt. 734), 39 pounds (0.045-lb. mole) of a branched chain ethoxy endblocked dimethylpolysiloxane having an average of three ethoxy groups per molecule (average mol. wt. 858), 189 grams of trifluoroacetic acid catalyst and 70 pounds of toluene solvent were charged to a reactor and heated with total reflux at 120° C. through an attached fractionating column. Reflux was continued with removal at the head of the column of the ethanol-toluene azeotrope distilling at 78–90° C. 5.71 pounds (0.124 mole) of ethanol were removed. At this point the kettle was cooled and 560 grams of sodium bicarbonate were added to neutralize the acid catalyst. Reflux was re-established for 30 minutes after which the kettle contents were cooled to 80° C. and filtered. The solution was then sparged with nitrogen and the toluene stripped off. There was obtained 120 pounds of a non-turbid yellow oil which was 90% of theory. This copolymer had a viscosity at 25° C. of 124 cs. and was found to have good lubricating properties having carried a 320-pound load on the standard SAE test machine. The elemental analysis of the copolymer gave:

|          | Found (wt.-percent) | Theory (wt.-percent) |
|----------|---------------------|----------------------|
| Carbon   | 53.5                | 54.8                 |
| Hydrogen | 9.9                 | 10.0                 |
| Silicon  | 8.9                 | 9.6                  |

EXAMPLE X.—BLOCK COPOLYMER FROM A HEXALKOXY POLYSILOXANE (M. W. 1686) AND A POLYPROPYLENE GLYCOL MONOALKYL ETHER (M. W. 625)

In a two-liter flask connected to a fractionating column there were placed 750 grams (1.2 moles) of the monobutyl ether of polypropylene glycol (av. mol. wt. 625), 337.2 grams (0.2 mole) of a multi-branched hexethoxy-endblocked dimethylsiloxane oil prepared by equilibrating hexaethoxydisilylethane with dimethylsiloxane cyclic tetramer (av. mol. wt. 1686), 1.5 grams trifluoroacetic acid catalyst and 454 grams of toluene. The mixture was heated at reflux temperature for 7 hours during which time 58 grams of ethyl alcohol was removed from the head of the column along with a small amount of toluene. After cooling the mixture to room temperature, 0.4 gram of triethanolamine was added to neutralize the catalyst. Upon distillation of the solvent under reduced pressure, there was obtained 100 grams of clear oil having a viscosity of 86.5 cs. at 100° F. The copolymer had excellent lubricating properties.

What is claimed is:

1. A composition of matter comprising a mixture of block copolymers wherein each copolymer contains a siloxane polymer and at least one oxyalkylene polymer in combination, the siloxane polymer being composed of at least one trifunctional silicon atom, bonded to three oxygen atoms and a single monovalent hydrocarbon radical, and joined to at least three difunctional silicon atoms through oxysilicon bonds, each of said difunctional silicon atoms having two monovalent hydrocarbon radicals bonded thereto and the oxyalkylene polymer being composed of at least five oxyalkylene groups bonded to each other by oxycarbon bonds and bonded at one end to the siloxane polymer through a carbon-oxy-silicon bond and bonded at the other end to a monoether radical.

2. A composition of matter as claimed in claim 1 in which the siloxane polymer comprises from 5% to 95% by weight of the block copolymer.

3. A composition of matter as claimed in claim 1 in which the siloxane polymer comprises from 5% to 15% by weight of the block copolymer.

4. A composition of matter as claimed in claim 1 in which the siloxane polymer comprises from 20% to 50% by weight of the block copolymer.

5. A composition of matter as claimed in claim 1 in which the elementary silicon content is from 2% to 25% by weight of the copolymer.

6. A composition of matter as claimed in claim 1 in which the siloxane polymer has an average molecular weight from about 500 to 10,000 and the oxyalkylene polymer has an average molecular weight from about 500 to 6,000.

7. A composition of matter comprising a mixture of block copolymers wherein each copolymer contains a siloxane polymer and at least one oxyalkylene polymer in combination and has the general formula:

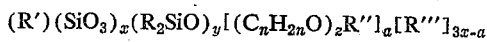

where R' is a hydrocarbon radical having the valence of $x$, R and R'' are monovalent hydrocarbon radicals, R''' is a member of the group consisting of alkyl radicals and $R_3Si-$ radicals, $x$ is an integer having a value of at least 1, $y$ is an integer having a value of at least 3, $n$ is an integer having a value of 2 to 4, $a$ is an integer having a value of at least one and not greater than $3x$ and $z$ is an integer having a value of at least 5.

8. A composition of matter comprising a mixture of block copolymers wherein each copolymer contains a siloxane polymer and three oxyalkylene polymers in combination and has the general formula:

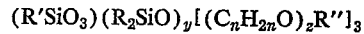

wherein R', R and R'' are monovalent hydrocarbon radicals, $y$ is an integer having a value of at least 3, $n$ is an integer having a value of 2 to 4, and $z$ is an integer having a value of at least 5.

9. A composition of matter comprising a mixture of block copolymers wherein each copolymer contains a siloxane polymer and three oxyalkylene polymers in combination and has the general formula:

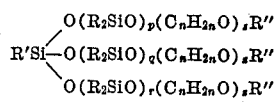

wherein R', R and R'' are monovalent hydrocarbon radicals, $p$, $q$, and $r$ are integers each having a value of at least 1, $n$ is an integer having a value of 2 to 4, and $z$ is an integer having a value of at least 5.

10. A composition of matter comprising a mixture of block copolymers wherein each copolymer contains a siloxane polymer and three oxyethylene polymers in combination and has the general formula:

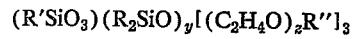

wherein R, R' and R'' are monovalent hydrocarbon radicals, $y$ is an integer having a value of at least 6 and $z$ is an integer having a value of at least 5.

11. A composition of matter comprising a mixture of block copolymers wherein each copolymer contains a siloxane polymer and three oxypropylene polymers in combination and has the general formula:

$$(R'SiO_3)(R_2SiO)_y[(C_3H_6O)_zR'']_3$$

wherein R, R' and R'' are monovalent hydrocarbon radicals, $y$ is an integer having a value of at least 6 and $z$ is an integer having a value of at least 5.

12. A composition of matter comprising a mixture of block copolymers wherein each copolymer contains a siloxane polymer and three oxyethylene-oxyalkylene polymers in combination and has the general formula:

$$(R'SiO)_3(R_2SiO)_y[(C_2H_4O)_b(C_3H_6O)_cR'']_3$$

wherein R, R' and R'' are monovalent hydrocarbon radicals, $y$ is an integer having a value of at least 6, and $b$ and $c$ are integers whose sum is at least 5.

13. A composition of matter as claimed in claim 12 in which the values of $b$, $c$ and $y$ are such that the ratio $$\frac{3b}{3c+y}$$

is at least equal to 0.25.

14. A composition of matter comprising a mixture of block copolymers wherein each copolymer contains a siloxane polymer and at least six oxyalkylene polymers in combination and has the general formula:

$$(R')(SiO_3)_x(R_2SiO)_y[(C_nH_{2n}O)_zR'']_{3x}$$

wherein R' is a polyvalent hydrocarbon radical having the valence of $x$, R and R'' are monovalent hydrocarbon radicals, $x$ is an integer having a value of at least 2, $n$ is an integer having a value of 2 to 4, and $z$ is an integer having a value of at least 5.

15. A composition of matter comprising a mixture of block copolymers wherein each copolymer contains a siloxane polymer and six oxyalkylene polymers in combination and has the general formula:

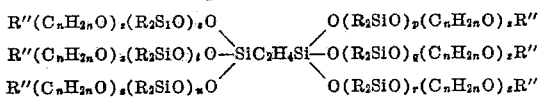

where R and R'' are monovalent hydrocarbon radicals, $s$, $t$, $u$, $p$, $q$, and $r$ are integers whose sum is at least 6, $n$ is an integer having a value of 2 to 4, and $z$ is an integer having a value of at least 5.

References Cited in the file of this patent

UNITED STATES PATENTS

| | | |
|---|---|---|
| 2,476,307 | Klein et al. | July 19, 1949 |
| 2,559,342 | Burkhard | July 3, 1951 |

OTHER REFERENCES

Volnov: Journal Gen. Chem. (U. S. S. R.), volume 10, 1940, pages 1600 to 1604.

UNITED STATES PATENT OFFICE

CERTIFICATE OF CORRECTION

Patent No. 2,834,748                                                      May 13, 1958

Donald L. Bailey et al

It is hereby certified that error appears in the printed specification of the above numbered patent requiring correction and that the said Letters Patent should read as corrected below.

Column 9, line 70, opposite "Trifluoroacetic acid" for "2.76 lb." read -- 0.9 lb. --; line 71, opposite "NaHCO$_3$" for "0.9 lb." read -- 2.76 lb. --; column 11, line 57, for "509,5 grams" read -- 509.5 grams --; column 16, line 3, after "at least 2," insert -- y is an integer having a value of at least 3 --.

Signed and sealed this 19th day of April 1960.

(SEAL)
Attest:

KARL H. AXLINE                                                     ROBERT C. WATSON
Attesting Officer                                         Commissioner of Patents